UNITED STATES PATENT OFFICE 1,944,327

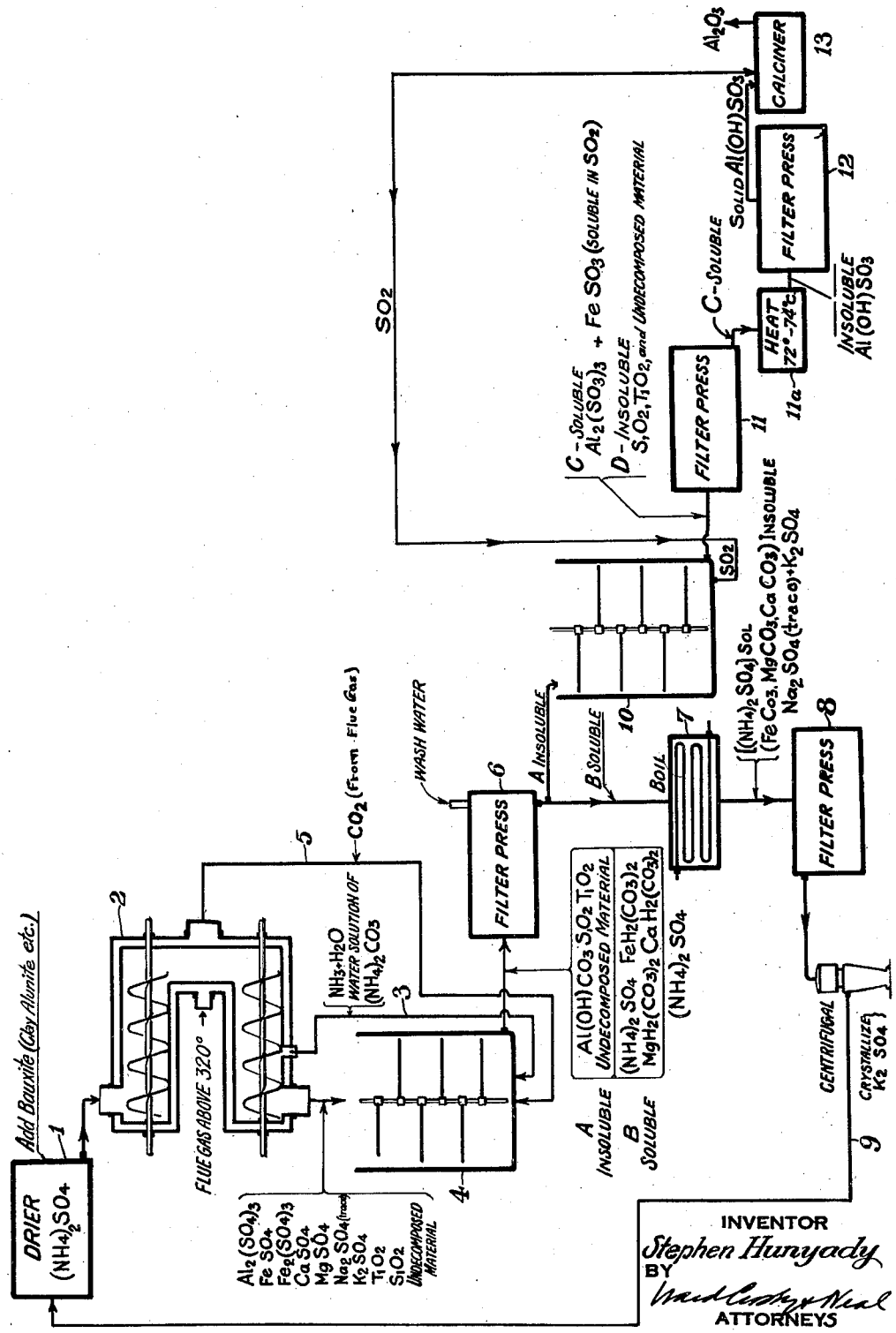

PROCESS OF OBTAINING ALUMINUM OXIDE OR THE LIKE

Stephen Hunyady, Bethlen, Hungary

Application May 19, 1930. Serial No. 453,833

14 Claims. (Cl. 23—143)

This invention relates to a process for treating material such as bauxite, clays, alunite and the like containing aluminum for the purpose of obtaining aluminum as oxide or otherwise.

Bauxite is a mineral deposit in which aluminum exists as a hydrated oxide $Al_2O_3.2H_2O$. There are several varieties of bauxite including white bauxite and red bauxite containing varying quantities of alumina and of impurities associated therewith. Alunite is a natural greyish hydrated basic potassium alum containing aluminum sulfate, potassium sulfate, alumina and water. Clays are natural hydrated compounds of alumina and silica. Both alunite and clays and other aluminum compounds from which aluminum oxide may be derived according to my invention contain also varying percentages of impurities. The impurities found in the materials such as bauxite, alunite, clays and the like with which I deal may consist of one or more of the following materials: Iron, silicon, titanium, calcium, magnesium, sodium and potassium, usually in some combined form. Where aluminum oxide is desired for the purpose of producing metallic aluminum or for other purposes requiring a relatively pure aluminum oxide, it is important that these impurities be removed so that they do not interfere with the properties desired in the aluminum oxide.

The principal object of the present invention accordingly is to provide a simple and efficient process of the kind mentioned which may be carried out in a relatively simple and readily obtainable apparatus to produce aluminum oxide and other forms of aluminum of a desired degree of purity. Other objects will be in part obvious and in part pointed out hereinafter.

The invention accordingly comprises the novel processes and steps of processes, specific embodiments of which are described hereinafter by way of example and in accordance with which I now prefer to practice the invention.

In the preferred example of my invention, as given below, I employ bauxite as the raw material to be treated, although the other aluminum containing substances mentioned above and related substances having similar properties, may likewise be employed in the process. In order that the steps set forth in the preferred example may be more readily followed and understood, there is included as a part of this application a flow sheet showing in diagrammatic form the steps of the process as I now prefer to practice them. It is to be understood that the preferred example and flow sheet are to be interpreted as illustrative of one way in which my invention may be carried out, but the invention is not limited thereto.

In carrying out my invention in its preferred form, I add finely ground bauxite to a solution of ammonium sulfate in water. The bauxite selected may contain hydrated aluminum oxide, ferrus and ferric oxide, silica, titanium, and calcium and magnesium in some combined form. The quantity of bauxite and ammonium sulfate employed will vary with the alumina and other content of the bauxite, but there should preferably be present sufficient ammonium sulfate to provide three mols or more of ammonium sulfate to one of aluminum oxide, and there should also be sufficient ammonium sulfate to combine with the ferrus and ferric oxide to form the respective sulfates in accordance with the following equations and under reaction conditions:

(1) $Al_2O_3 + 3(NH_4)_2SO_4 = Al_2(SO_4)_3 + 6NH_3 + 3H_2O$ (2) $Fe_2O_3 + 3(NH_4)_2SO_4 = Fe_2(SO_4)_3 + 6NH_3 + 3H_2O$ (3) $FeO + (NH_4)_2SO_4 = FeSO_4 + 2NH_3 + H_2O$

The other bases, lime and magnesia, form similar sulfates. The bauxite and ammonium sulfate are combined in a dryer designated as 1 in the flow sheet, the ammonium sulfate solution being circulated back to the dryer from another stage of the process, preferably as described later. The solution is evaporated to dryness so that the ammonium sulfate is deposited on the particles of the bauxite. The dried heated mass is then fed continuously into the reaction chamber 2 provided with worm conveyors carrying it through the chamber, the chamber being provided with heating flues through which flue gas containing $CO_2$ and heated to a temperature so that the mass of bauxite and ammonium sulfate may be heated to the range 300–320° C. while it is passing through the reaction chamber. Under these circumstances the reactions (1), (2) and (3) above take place, the ammonium and water liberated being fed through a pipe 3 into a tank 4 containing a solution of ammonium carbonate. The flue gas after leaving the reaction chamber also passes into this tank through a pipe 5 so that the ingredients ammonia and $CO_2$ and water for forming a solution of ammonia carbonate are being continuously fed to the tank 4.

The material obtained from the reaction chamber in powdered form is cooled and mixed with the water solution of ammonium carbonate in the tank 4. Alternatively the powder may be dissolved in hot water, cooled and mixed with the ammonium carbonate solution. The tank 4 is provided with an agitator to keep the mass stirred. The powder mentioned will contain ammonium, calcium and magnesium sulfate, ferric sulfate, sodium and potassium sulfate, titania, silica and perhaps undecomposed bauxite.

Upon coming in contact with ammonium carbonate the following reactions take place with the aluminum and iron salts:

(4) $Al_2(SO_4)_3 + 3(NH_4)_2CO_3 + H_2O =$
    $2Al(OH)CO_3 + 3(NH_4)_2SO_4 + CO_2$ (5) $FeSO_4 + (NH_4)_2CO_3 = Fe_2CO_3 + (NH_4)_2SO_4$ (6) $Fe_2(SO_4)_3 + 3(NH_4)_2CO_3 + H_2O =$
    $2Fe(OH)CO_3 + 3(NH_4)_2SO_4 + CO_2$

The result of these reactions is therefore, to produce aluminum hydroxy carbonate which with silica, titanium and some undecomposed bauxite will be insoluble materials. The ammonium sulfate remains as such. Iron, magnesium sodium and potassium and calcium acid carbonates are soluble in an excess of $CO_2$ which is maintained in the tank 4. The amount of sodium present is usually only as a trace. Potassium sulfate is present in larger amounts particularly in the case of alunite.

To separate the insoluble from the soluble materials the mass in the tank 4 is then passed to a filter press 6 where separation occurs. The insoluble material then passes to a tank 7 for treatment with a water solution of sulfur dioxide. The solid materials are washed on the filter press preferably with wash water containing a small quantity of ammonium carbonate. The insoluble material just referred to is designated as A on the flow sheet and the soluble material as B.

The soluble materials which comprise ammonium sulfate, iron, magesium and calcium acid carbonate, a trace of sodium sulfate and potassium sulfate, are passed to a tank 7 and boiled with the result that the acid carbonates are broken up and iron magnesium and calcium carbonate are formed, these being filtered off in a filter press 8. The ammonium sulfate, trace of sodium sulfate and potassium sulfate pass as filtrate through a line 9, returning to the dryer 1 to be mixed with quantities of bauxite or similar material used in the process. If the quantity of alkali sulfate, such as potassium sulfate, in this filtrate is large, it may sometimes be preferable to allow it to crystallize out and then to separate these crystals by a centrifuge 9.

The insolubles, aluminum hydroxy carbonate, silica, titania and any undecomposed bauxite are then passed to a tank 10 where they are mixed with a water solution of sulfur dioxide by which the aluminum hydroxy carbonate is transformed into aluminum sulfite $Al_2(SO_3)_3$, designated as C on the flow sheet, leaving silica, titanium and undecomposed materials as insoluble, designated as D. The tank is preferably provided with a stirrer for keeping the mass in agitation.

In order to separate the silica, titanium and other insoluble matters from the aluminum sulfite, the mass is passed through a filter press 11 and the insoluble matters removed. These matters are then washed with water containing sulfur dioxide. The filtrate obtained contains aluminum sulfite. This solution upon being heated in heating tank 11ª to 72–74° C. forms insoluble aluminum hydroxy sulfite $AlOHSO_3$, which is insoluble and is passed to a filter press 12 where it is obtained as a solid mass which is then passed to a calciner 13 where it is calcined to produce aluminum oxide $Al_2O_3$. The equations for the formation of aluminum sulfite, aluminum hydroxy sulfite, and for the conversion of aluminum hydroxy sulfite into aluminum oxide are as follows:—

(7) $2Al(OH)CO_3 + 3SO_2 = Al_2(SO_3)_3 + 2CO_2 + H_2O$ (8) $Al_2(SO_3)_3 + H_2O = 2Al(OH)SO_3 + SO_2$ (9) $2Al(OH)SO_3 = Al_2O_3 + 2SO_2 + H_2O$

In practice the tank 10 and filter press 11 will ordinarily be eliminated. They are simply included here in order to make the flow of the materials more readily understandable. Where these tanks are eliminated in practice the material remaining on the filter press 6 consisting of aluminum hydroxy carbonate, silica, titanium and undecomposed bauxite, will be washed in this filter with sulfur dioxide water solution, the filtrate passing directly to the heating tank 11ª where it is heated as indicated to 72–74° C.

The $SO_2$ produced by calcination will ordinarily be returned from the calciner to the tank 10 for further use there.

Along with the aluminum hydroxy carbonate, silica, titania and undecomposed material, there may be a small quantity of insoluble iron included which upon treatment of $SO_2$ in the tank 7, will form iron sulfite which is soluble in an excess of $SO_2$. Upon heating the solution to form aluminum hydroxy sulfite, the insignificant quantity of iron sulfite stays in solution.

The aluminum oxide thus obtained is of a high degree of purity being substantially free from the impurities found associated with the aluminum in the original mineral employed. The aluminum oxide may be employed for the production of metallic aluminum or for compounds of aluminum, as desired. The process is a simple and efficient one, employing readily obtainable apparatus and operating on minerals which are easily obtainable. The process is operated continuously as indicated and in addition to the economy thus effected includes particularly the economies effected by the recovery of ammonium sulfate and its utilization for treatment of other quantities of mineral as well as the recovery of sulfur dioxide for re-treatment of the aluminum hydroxy carbonate to produce aluminum sulfite. The treatment of bauxite and other mineral with ammonium sulfate solution with subsequent evaporation affords an intimate mixture of the ingredients for reaction so that when these ingredients are introduced into the reaction chamber 2, they react more quickly than where the dry powders are simply physically agitated to produce a mixture.

While I have described my improvements in great detail and with respect to certain preferred embodiments thereof, I do not desire to be limited to such details or embodiments since many changes and modifications may be made and the invention embodied in widely different forms without departing from the spirit and scope thereof in its broader aspects. Hence I desire to cover all equivalents and all modifications and forms coming within the language or scope of any one or more of the appended claims.

What I claim as new and desire to secure by Letters Patent is:

1. A process for obtaining aluminum from mineral containing it, which comprises treating an aluminum salt in a solution obtained from said mineral with an agent so as to form aluminum hydroxy carbonate, recovering said aluminum hydroxy carbonate along with other insolubles from said mineral, and treating said carbonate and insolubles with a reagent to form aluminum sulfite.

2. A process for obtaining aluminum from mineral containing it, which comprises treating an aluminum salt in a solution obtained from said mineral with a reagent so as to form aluminum hydroxy carbonate, and treating said carbonate along with other insolubles from said mineral with sulfur dioxide to form aluminum sulfite.

3. A process for obtaining aluminum from mineral containing it, which comprises treating the mineral with ammonium sulfate, thereby producing aluminum sulfate, reacting the aluminum sulfate to form aluminum hydroxy carbonate, recovering said aluminum hydroxy carbonate along with other insolubles from said mineral, treating said carbonate and insolubles with a reagent so as to form aluminum sulfite.

4. A process for obtaining aluminum from mineral containing it, which comprises treating the mineral with ammonium sulfate, thereby producing aluminum sulfate, reacting the aluminum sulfate to form aluminum hydroxy carbonate, and treating said carbonate along with other insolubles from said mineral with sulfur dioxide so as to form aluminum sulfite.

5. A process for obtaining aluminum from mineral containing it, which comprises treating an aluminum salt in a solution obtained from said mineral with an agent so as to form aluminum hydroxy carbonate, recovering said aluminum hydroxy carbonate along with other insolubles from said mineral, treating said carbonate and insolubles with a reagent so as to form aluminum sulfite, treating the solution of aluminum sulfite so as to produce insoluble aluminum hydroxy sulfite and calcining the aluminum hydroxy sulfite to produce aluminum oxide.

6. A process for obtaining aluminum from mineral containing it, which comprises treating an aluminum salt in a solution obtained from said mineral with a reagent so as to form aluminum hydroxy carbonate, and treating said carbonate along with other insolubles from said mineral with sulfur dioxide so as to form aluminum sulfite, treating the solution of aluminum sulfite so as to produce insoluble aluminum hydroxy sulfite and calcining the aluminum hydroxy sulfite so as to produce aluminum oxide.

7. A process for obtaining aluminum which comprises continuously heating material containing aluminum and substances such as iron, magnesium, alkali and the like with ammonium sulfate, continuously mixing the product containing aluminum sulfate with a water solution of ammonium carbonate, thereby forming aluminum hydroxy carbonate and soluble materials including ammonium sulfate and alkaline earth sulfates, filtering off the aluminum hydroxy carbonate and other insolubles, recovering the soluble material containing ammonium sulfate, iron acid carbonate and alkaline earth acid carbonates and other sulfates, boiling the solution to form insoluble iron and alkaline earth carbonates and removing such insoluble carbonates, continuously returning the ammonium sulfate to a dryer, combining it with aluminum containing material in said dryer and evaporating the mixture to dryness to produce a mixture of such material and ammonium sulfate for feeding to the reaction chamber above, continuously treating the aluminum hydroxy carbonate and other insolubles mentioned with a water solution of sulfur dioxide, thereby producing aluminum sulfite which is soluble in the reaction mixture, filtering the aluminum sulfite solution to remove the insoluble material just mentioned, heating the aluminum sulfite solution to form aluminum hydroxy sulfite which is insoluble, filtering off the aluminum hydroxy sulfite and calcining it to form aluminum oxide, thereby also producing sulfur dioxide and returning the sulfur dioxide to the water solution thereof previously mentioned.

8. A process for obtaining aluminum which comprises, continuously heating material containing aluminum oxide such as bauxite with ammonium sulfate in a chamber to 300°–320° C., continuously mixing the product containing aluminum sulfate with a water solution of ammonium carbonate, thereby forming aluminum hydroxy carbonate which, with any titanium oxide and silica and undecomposed bauxite present, are insoluble in the reaction liquid, and soluble materials including ammonium sulfate and alkaline earth sulfates, filtering off the aluminum hydroxy carbonate and other insolubles including any titanium oxide and silica and undecomposed bauxite, recovering the soluble material containing ammonium sulfate, any iron acid carbonate and alkaline earth acid carbonates and other sulfates present, boiling the solution to form insoluble iron and alkaline earth carbonates and removing such insoluble carbonates, continuously returning the ammonium sulfate to a dryer, combining it with bauxite in said dryer and evaporating the mixture to dryness to produce a mixture of bauxite and ammonium sulfate for feeding to the reaction chamber above, continuously treating the aluminum hydroxy carbonate and other insolubles mentioned with a water solution of sulfur dioxide, thereby producing aluminum sulfite which is soluble in the reaction mixture, the insolubles including any silica and titanium oxide and undecomposed bauxite remaining insoluble, filtering the aluminum sulfite solution to remove the insoluble material just mentioned, heating the aluminum sulfite solution to approximately 72–74° C. to form aluminum hydroxy sulfite which is insoluble, filtering off the aluminum hydroxy sulfite and calcining it to form aluminum oxide, thereby also producing sulfur dioxide and returning the sulfur dioxide to the water solution thereof previously mentioned.

9. The steps in the process of obtaining aluminum from material containing it consisting in evaporating a solution of ammonium sulfate with said material to dryness prior to causing reaction between said sulfate and mineral and recovering the dried material coated with ammonium sulfate.

10. The steps in the process of obtaining aluminum from bauxite consisting in evaporating a solution of ammonium sulfate with said bauxite to dryness prior to causing reaction between said sulfate and bauxite and recovering the dried bauxite coated with ammonium sulfate.

11. A process for obtaining aluminum from mineral containing it, which comprises treating the mineral with ammonium sulfate to form aluminum sulfate and ammonia, forming a bath of ammonium carbonate with said ammonia, combining the aluminum sulfate and ammonium carbonate to form aluminum hydroxy carbonate and re-forming ammonium sulfate, recovering the ammonium sulfate and treating a further quantity of mineral therewith.

12. A process for obtaining aluminum from bauxite, which comprises treating the bauxite with ammonium sulfate to form aluminum sulfate and ammonia, forming a bath of ammonium carbonate with said ammonia, combining the aluminum sulfate and ammonium carbonate to form aluminum hydroxy carbonate and re-forming ammonium sulfate, recovering the ammonium sulfate and treating a further quantity of bauxite therewith.

13. A process for obtaining aluminum, which comprises treating impure aluminum hydroxy carbonate with sulfur dioxide to produce soluble aluminum sulfite, removing impurities insoluble in sulfur dioxide solution therefrom, converting the aluminum sulfite into aluminum hydroxy sulfite, calcining the hydroxy sulfite to produce aluminum oxide and sulfur dioxide, and recovering the sulfur dioxide to treat further quantities of aluminum hydroxy carbonate.

14. A process for obtaining aluminum from mineral containing it, which comprises treating the mineral containing impurities such as iron, calcium and magnesium with ammonium sulfate to form aluminum sulfate and ammonia, forming a bath of ammonium carbonate with said ammonia combining aluminum sulfate and ammonium carbonate to form aluminum hydroxy carbonate, re-forming ammonium sulfate and producing acid carbonates of any iron, magnesium or calcium present, separating the aluminum hydroxy carbonate from the soluble substances, boiling the solution of soluble substances to precipitate any iron, magnesium or calcium carbonate, removing such carbonates and recovering the ammonium sulfate to treat a further quantity of mineral therewith.

STEPHEN HUNYADY.